United States Patent [19]

Johnston et al.

[11] Patent Number: 4,620,620

[45] Date of Patent: Nov. 4, 1986

[54] ACTUATOR FOR ADJUSTABLE HYDRAULIC DAMPER

[75] Inventors: Daniel U. Johnston; Thomas R. Sowash; Richard D. Watson, all of Anderson, Ind.

[73] Assignee: General Motors Corporation, Detroit, Mich.

[21] Appl. No.: 588,571

[22] Filed: Mar. 12, 1984

[51] Int. Cl.$^4$ ............................................... F15F 9/50
[52] U.S. Cl. ........................................ 188/319; 74/88; 188/299; 251/129.19; 251/230; 280/714; 403/229; 464/30; 464/160
[58] Field of Search .................. 188/319, 299, 285; 280/707, 714; 251/80, 230, 129.19; 74/88; 464/30, 160; 403/229

[56] References Cited

U.S. PATENT DOCUMENTS

| | | | |
|---|---|---|---|
| 978,706 | 12/1910 | Davidson | 251/230 X |
| 1,394,756 | 10/1921 | Mueller et al. | 251/80 |
| 1,767,611 | 6/1930 | Payne | 251/230 X |
| 1,839,483 | 1/1932 | Humphrey | 251/80 |
| 1,977,288 | 10/1934 | Purdy | 251/80 X |
| 2,217,399 | 10/1940 | Edwards | 251/80 X |
| 2,752,513 | 6/1956 | Boyd | 74/88 X |
| 2,950,785 | 8/1960 | Patriquin | 188/319 |
| 3,039,566 | 6/1962 | Ramsey | 188/299 |
| 3,125,186 | 3/1964 | Day | 188/319 X |
| 3,152,665 | 10/1964 | Dickinson et al. | 188/319 X |
| 3,156,125 | 11/1964 | Straub | 74/88 X |
| 3,934,814 | 1/1976 | Orszak | 251/80 |
| 4,313,529 | 2/1982 | Kato et al. | 188/299 |
| 4,463,839 | 8/1984 | Ashiba | 188/319 X |
| 4,527,676 | 7/1985 | Emura et al. | 188/299 |

FOREIGN PATENT DOCUMENTS

| | | | |
|---|---|---|---|
| 58-57534 | 4/1983 | Japan | 188/299 |
| 957267 | 5/1964 | United Kingdom | 251/80 |
| 771395 | 10/1980 | U.S.S.R. | 251/80 |

Primary Examiner—George E. A. Halvosa
Attorney, Agent, or Firm—Saul Schwartz

[57] ABSTRACT

The actuator is disposed in the damper piston rod and includes a solenoid with a reciprocating plunger, a motion converting mechanism which converts solenoid reciprocation to rotation of an input driver, an intermediate driver rotatable with the input driver, a rotatable output driver connected to a valve adjusting rotor in the damper piston, and a torsion spring between the intermediate and output drivers. The spring holds the output driver in a following relation to the intermediate driver so that when pressure spikes immobilize the valve rotor and output driver, the input driver can continue to rotate to a control position. When rotor mobility returns, the spring automatically advances the output driver and valve rotor to the same position which would have been achieved had the rotor not been temporarily immobilized.

1 Claim, 6 Drawing Figures

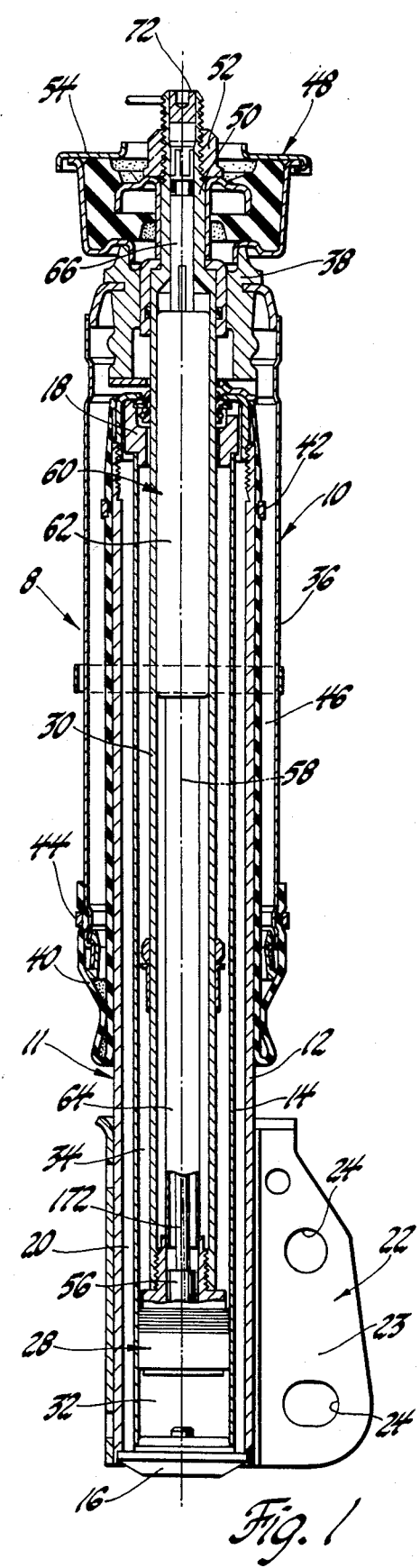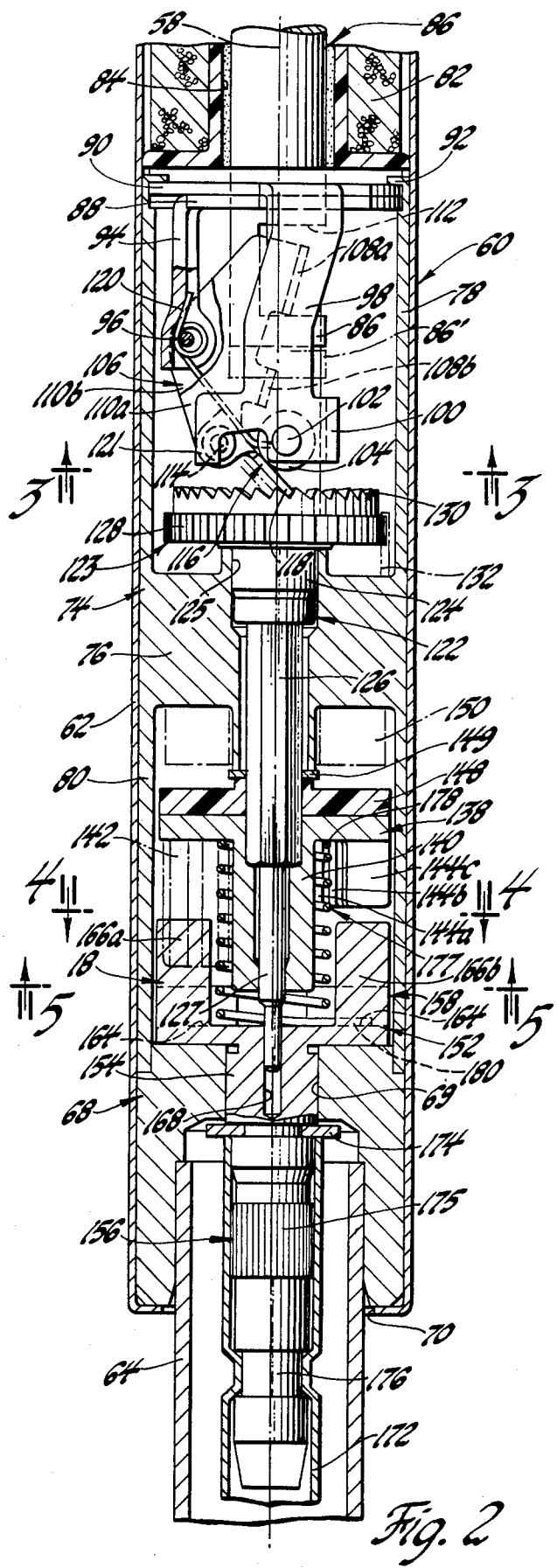

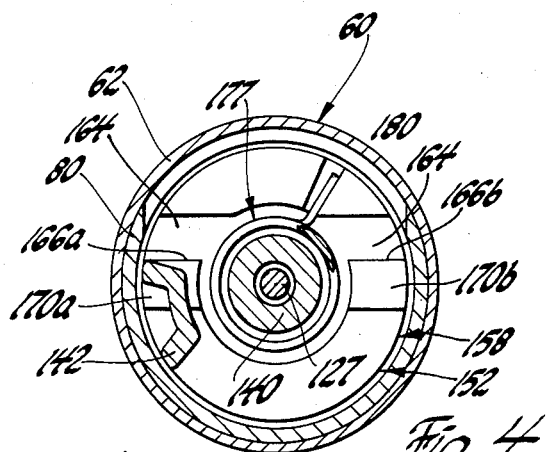
Fig. 4
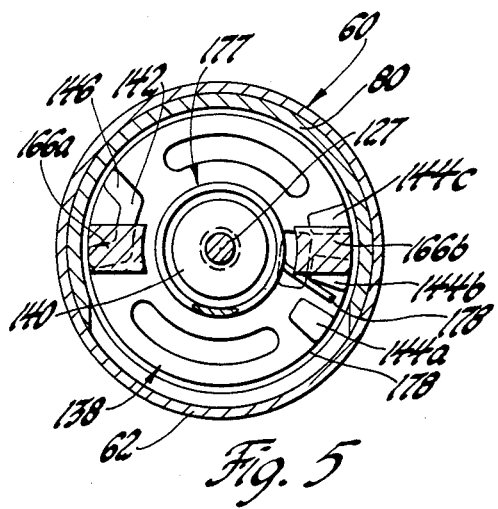
Fig. 5
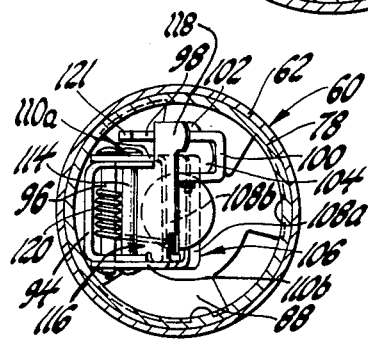
Fig. 3
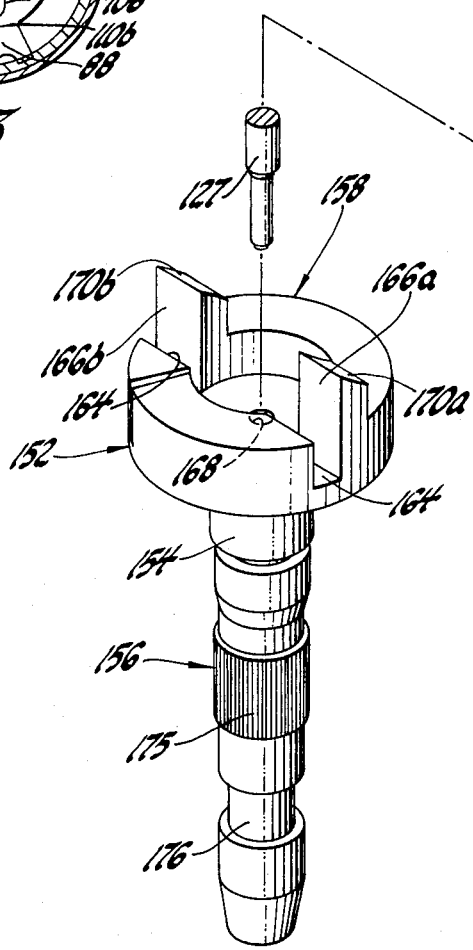
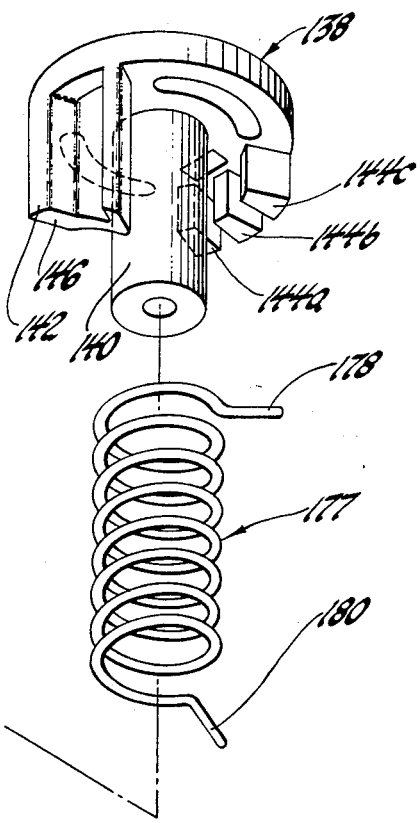
Fig. 6

ACTUATOR FOR ADJUSTABLE HYDRAULIC DAMPER

BACKGROUND OF THE INVENTION

1. Field of the Invention

This invention relates generally to adjustable hydraulic dampers for vehicles and, more particularly, to a new and improved actuator for effecting adjustment.

2. Description of the Prior Art

In active suspension systems, the amount of damping provided by a vehicle's hydraulic dampers or shock absorbers is continuously adjustable during operation of the vehicle to provide optimum ride and/or handling. Typically, such systems include a plurality of sensors for detecting road conditions, an adjustable valve arrangement associated with each damper to vary the fluid flow characteristics thereof, and a preprogrammed on board control to adjust each valve arrangement in response to inputs provided by the sensors. Adjustable valve arrangements have been proposed wherein rotors on the shock absorber pistons or in side mounted housings are rotatable through a plurality of angularly spaced positions corresponding to different hydraulic damping capabilities. In one system, an electric motor driven gear train on the piston rod rotates a rotor mounted on the piston through a shaft extending down through the piston rod of the damper. In another system, a solenoid actuated plunger in a housing associated with the damper rotates a rotor in stepwise fashion between its control positions. In the former system, pressure spikes may temporarily immobilize the rotor on the piston and the actuator on the piston rod and a simple method of storing the control input to the rotor until mobility of the latter returns is absent. In the latter system, a space consuming side housing is required for the solenoid actuator. A rotary actuator according to this invention includes simple, economical, and novel structure for isolating the actuator from temporary immobility of the rotor and for storing the control input until mobility returns.

SUMMARY OF THE INVENTION

The primary feature, then, of this invention is that it provides a new and improved actuator for rotating a valve rotor on a piston of a hydraulic damper between a plurality of positions providing varying damping capability. Another feature of this invention resides in the provision in the new and improved actuator of means for storing a control input when the rotor is temporarily immobilized by pressure spikes in the damper until mobility returns and then rotating the rotor to a position corresponding to the control input. Still another feature of this invention resides in the provision in the new and improved actuator of an input driver on the piston rod rotatable in stepwise fashion by an electric solenoid, an output driver on the piston rod rotatable as a unit with the rotor on the piston, and connecting means between the input and output drives whereby the two are normally unitarily rotatable and whereby the input driver is rotatable relative to the output driver when the rotor is immobilized until mobility returns after which the output driver is automatically rotated until the rotor achieves a position corresponding to the position of the input driver. And a still further feature of this invention resides in the provision in the new and improved actuator of connecting means including an intermediate driver connected to the input driver and a torsion spring between the intermediate driver and the output driver which spring normally holds an arm on the output driver against an abutment on the intermediate driver so that the two are unitarily rotatable but which permits relative rotation therebetween when the rotor and output driver are temporarily immobilized, the spring thereafter rotating the output driver when rotor mobility returns until the arm on the output driver reengages the abutment on the intermediate driver thereby locating the rotor in a position corresponding to the position of the input driver.

These and other features of this invention will be readily apparent from the following specification and from the drawings wherein:

FIG. 1 is a partially broken away elevational view of a combination pneumatic spring and strut type hydraulic damper having a rotary actuator according to this invention;

FIG. 2 is an enlarged, partially broken away view of a portion of FIG. 1 showing the rotary actuator according to this invention;

FIG. 3 is a reduced view taken generally along the plane indicated by lines 3—3 in FIG. 2;

FIG. 4 is a sectional view taken generally along the plane indicated by lines 4—4 in FIG. 2;

FIG. 5 is a sectional view taken generally along the plane indicated by lines 5—5 in FIG. 2; and FIG. 6 is an exploded perspective view of a portion of the rotary actuator according to this invention.

Referring to FIG. 1 of the drawings, a combination pneumatic spring and strut type hydraulic damper 8 includes a spring portion 10 and a damper portion 11. The damper portion 11 includes an outer cylindrical tube 12 and a fluid filled inner cylindrical tube 14 rigidly connected to the outer tube at the lower end of the damper by a foot valve 16 and at the upper end of the damper by a bearing and seal assembly 18 with an annular reservoir 20 being defined between the inner and outer tubes. A bracket 22 is rigidly attached to the outer tube 12 at the lower extremity of the damper and includes a flange 23 with a pair of apertures 24 whereby the damper is suited for bolt attachment to a portion of the vehicle unsprung mass such as a wheel spindle or steering knuckle assembly, not shown. A piston assembly 28 is slidably disposed in the inner tube 14 and is rigidly connected to a hollow piston rod 30 which slidably and sealingly projects through the bearing and seal assembly 18, the piston dividing the fluid filled interior of the inner tube 14 into a compression chamber 32 between the piston and the foot valve 16 and an annular rebound chamber 34 around the piston rod 30 between the piston and the seal assembly 18.

The spring portion 10 includes a rigid sleeve 36 sealingly connected at its upper end to an annular member 38 which, in turn, is rigidly attached to the upper end of the hollow piston rod 30. A flexible sleeve 40 surrounds the outer tube 12 and is sealingly clamped thereagainst at the upper end of the outer tube by a band 42. The flexible sleeve 40 extends down along the outer tube and below the lower end of rigid sleeve 36 and is then folded back over the rigid sleeve 36 and clamped to the lower end of the latter by a band 44 so that an air chamber 46 is defined between the sleeves 36 and 40. Conventional valve means, not shown, on the rigid sleeve 36 admit pressurized air to the chamber 46.

For attaching the combination spring and damper 8 to the vehicle sprung mass, a seat assembly 48 is disposed around a reduced stem portion 50 of the piston rod 30 and is clamped against the member 38 by a nut 52. A flat surface portion 54 of the seat assembly 48 is adapted for seating against a corresponding surface on the sprung mass portion of the vehicle, not shown, and for rigid attachment thereto, as by bolting. Accordingly, when the seat assembly 48 is thus attached to the sprung mass portion of the vehicle and the flange 23 is attached to the unsprung mass portion, the piston assembly 28 reciprocates within the inner tube 14 during suspension excursions while air in the pressure chamber 46 resiliently supports the sprung mass on the unsprung mass. It will be understood that even though the damper portion 11 is illustrated in combination with a pneumatic spring in a strut type assembly, it may equally be combined with a coil spring in a strut type assembly or function in standard shock absorber fashion in conventional control arm type suspension systems.

The piston assembly 28 cooperates with the foot valve 16 in known fashion to damp suspension excursions of the unsprung mass relative to the sprung mass. Generally, during a jounce excursion, the piston assembly 28 is forced down in the inner tube 14 while valving on the piston assembly permits relatively unobstructed passage of fluid from the compression chamber 32 into the rebound chamber 34. Concurrently, a volume of fluid corresponding to the increasing volume of the piston rod 30 within the inner tube 14 escapes to the reservoir 20 through foot valve 16. Conversely, during a rebound suspension excursion, the piston assembly 28 moves up in the inner tube 14 while valving in the piston assembly throttles fluid thereacross from the rebound chamber 34 to the compression chamber 32, the foot valve 16 concurrently permitting fluid migration from the reservoir 20 to the compression chamber 32 to compensate for the reduced volume of the piston rod 30 within the inner tube. The piston assembly 28 includes a rotor 56 supported on the assembly for rotation about a longitudinal axis 58 of the spring and damper 8. The rotor 56 is rotatable through a plurality of control positions wherein different valves or combinations of valves, not shown, on the piston are activated to provide different damping capabilities. An actuator 60 according to this invention is disposed within the piston rod 30 and operates to rotate the rotor 56 between its control positions in accordance with electronic signals from an on-board control, not shown, on the sprung mass of the vehicle.

As seen best in FIGS. 1 and 2, the actuator 60 includes a cylindrical housing 62 having an outside diameter corresponding generally to the inside diameter of the piston rod 30, an outer tube 64, and a connector tube 66. A cylindrical shaft support 68 having a bore 69 therethrough is disposed in the housing 62 at the lower end thereof and receives the upper end of outer tube 64 through an aperture 70 in the lower end of the housing 62 whereby the outer tube is rigidly attached to the shaft support and to the housing. The lower end of the outer tube is connected by conventional means to the piston assembly 28 so that the housing 62, the outer tube 64, and the piston assembly 28 form a rigid unit. The connector tube 66 is likewise rigidly connected to the housing 62 and projects up through the center of the reduced stem portion 50 of the piston rod to an electrical connector 72 whereat terminals, not shown, are provided for electrically connecting the actuator 60 to the on-board control. Because the piston rod 30 is attached to the seat assembly 48 which, in turn, is attached to the sprung mass portion of the vehicle, the actuator 60 and the connector 72 remain stationary relative to the sprung mass portion as the inner and outer tubes 12 and 14 reciprocate vertically relative to the piston assembly 28 during suspension excursions.

With particular reference to FIG. 2, a generally cylindrical frame 74 is disposed in the housing 62 adjacent the shaft support 68 with a center web portion 76 thereof separating an upper cylindrical portion 78 from a lower cylindrical portion 80. The lower end of the lower cylindrical portion 80 is received in a corresponding outer groove in the shaft support 68 whereby the shaft support and frame are rigidly connected. The remainder of the volume of the housing 62 above the frame 74 is consumed by a cylindrical electric solenoid winding 82 enclosed in an insulating jacket defining a longitudinal bore 84 aligned on the axis 58. The winding 82 is energizable by the on-board control through conductors, not shown, extending up through the connector tube 66 to the connector 72. The magnetic field developed upon energization of the winding 82 acts on a plunger 86 in the bore 84 whereby the plunger is stroked vertically from an at-rest position 86' to a retracted position shown in solid lines in FIG. 2.

As seen best in FIGS. 2 and 3, a first support bracket 88 and a second support bracket 90 have flange portions captured between an appropriate shoulder at the open end of upper cylindrical portion 78 of the frame 74 and a rolled over end 92 of the latter and are thereby rigidly attached to the frame. A metallic guide assembly, not shown, provided below the winding 82 guides the plunger 86 through a non-metallic bushing and provides a magnetic flux path from the plunger back to the frame 74. The first bracket 88 has an integral, depending hinge support 94 carrying a hinge pin 96. The second support bracket 90 includes an integral, depending roller support 98 having a U-shaped extremity 100. A pin 102 extends between the legs of the U-shaped extremity 100 and rotatably supports a roller 104. An actuating lever 106 has a pair of webs 108a and 108b interconnecting a pair of opposite sides 110a and 110b of the lever straddling the hinge support 94 of the first support bracket 88. The sides 110a and 110b include appropriate apertures for receipt of the hinge pin 96 whereby the actuating lever 106 is supported on the first bracket for pivotal movement about the pin between an extended position shown in FIG. 2 and a retracted position, not shown, angularly displaced clockwise from the extended position. The web 108a is disposed in a transverse groove 112 in the plunger 86 with the opposite sides 110a and 110b of the lever straddling the plunger and with the web 108b being located below the lower end of the plunger. Accordingly, when the plunger 86 is stroked by the winding 82 from the at-rest to the extended position, the actuating lever 106 is pivoted from the retracted to the extended position.

The opposite sides 110a and 110b of the actuating lever 106 support therebetween another hinge pin 114 on which is pivotally supported a pawl 116 having a forwardly and laterally extending foot portion 118 at one side thereof. A torsion spring 120, coiled around the hinge pin 96, has one leg bearing against the fixed hinge support 94 and the other leg bearing against the pawl 116 so that the actuating lever is urged clockwise, FIG. 2, to the retracted position wherein the laterally extending foot portion 118 engages a depending tab 121 on the roller support 94 which prevents further clockwise movement of the actuating lever.

The actuator 60 further includes an input driver 122 having a disc-shaped head 123, a hub 124 journalled in a bore 125 in the center web portion 76 of the frame 74 whereby the input driver is rotatable about the axis 58, a hex shaft portion 126, and a pilot shaft portion 127. A plurality of circumferential teeth 128 are formed on the head 123 around the outside diameter thereof and a plurality of face teeth 130 are formed in an annular array on the side of the head 123 facing the pawl 116. In the retracted position of the actuating lever 106, the spring 120 biases the foot portion 118 against one of the face teeth 130 on the head 123. When the plunger 86 is stroked by the winding 82 from the at-rest to the retracted position and the actuating lever rocked from the retracted to the extended position, the foot portion 118 of the pawl 116 rotates the input driver 122 until the pawl engages the roller 104. The roller 104 limits movement of the input driver 122 to an angle corresponding generally to the angular spacing between the face teeth 130. When the winding 82 is deenergized after each stroke of the plunger 86, the spring 120 returns the actuating lever 106, the pawl 116, and the plunger to their original retracted and at-rest positions, respectively. A schematically illustrated flexible lever 132 mounted on the center web portion 76 yieldably engages the circumferential teeth 128 on the head 123 to maintain the angular position of the input driver when the solenoid winding 82 is deenergized.

As seen best in FIGS. 2 and 4 through 6, an intermediate driver 138 has a hub 140 pressed on hex shaft portion 126 of the input driver whereby the intermediate driver is supported on and rotatable as a unit with the input driver. The intermediate driver 138 further includes an abutment 142 extending parallel to the axis 58 and three projections 144a, 144b and 144c generally diametrically opposite the abutment. The distal end of the abutment 142 is beveled to define an end face 146. An electrical contact carrier 148 on hex shaft portion 126 is separated from the center web 76 by a washer 149 and is rotatable as a unit with the intermediate driver. The contact carrier 148 cooperates with a schematically illustrated contact support 150 rigidly attached to the frame 74 through a plurality of contacts, not shown. The inherent resilience of the contacts, together with the resilient force imparted to the input driver 122 by the pawl 116, urges the input and intermediate drivers downward, FIG. 2. Electrical conductors, not shown, extending from the contact support to the connector 72 on the stem portion 50 of the piston rod 30 connect to the on-board control and provide a signal to the latter representative of the angular position of the input driver.

An output driver 152 has a cylindrical portion 154 journalled in bore 69 of the shaft support 68 whereby the output driver is supported on the shaft support 68 and the housing 62 for rotation on the axis 58. The output driver further includes a shaft portion 156 and a head 158 integral with the shaft portion. The head 158 has a transverse groove 164, a pair of diametrically opposed upstanding arms 166a and 166b, and a pilot bore 168 which receives the pilot shaft portion 127 of the input driver 122 thereby supporting that end of the input driver on the housing 62. The distal ends of the arms 166a and 166b are beveled at angles corresponding to the angle of beveled end face 146 on the abutment 142 to define end faces 170a and 170b. An inner tube 172 is received over the end of shaft portion 156 of the output driver and abuts a stop ring 174 on the shaft portion, the inner tube being pressed over a serrated section 175 on and rolled into a groove 176 in the shaft portion 156 so that the inner tube 172 is rotatable as a unit with the output driver 152 about the axis 58. The lower end of the inner tube 172 is nonrotatably connected to the rotor 56 on the piston assembly 28 so that the rotor is rotatable as a unit with the output driver and the inner tube. A torsion spring 177 is coiled around the hub 140 of the input driver 138 and has a first end 178 extending radially between the projections 144a and 144b and a second end 180 extending radially into an appropriate receptacle in the head 158 of the output driver 152. The torsion spring is prestressed prior to assembly to bias the intermediate and output drivers 138 and 152, respectively, in opposite directions until end face 170a on arm 166a on the output driver engages end face 146 on abutment 142 on the intermediate driver. The force with which the end face 170a is held against end face 146 is somewhat adjustable depending upon whether the first end 178 of the spring is disposed between projections 144a and 144b or between 144b and 144c.

In the embodiment illustrated, the spring rate of spring portion 10 and the damping capability of damper portion 11 of the spring and damper 8 may each be adjustable during vehicle operation for optimum suspension performance. With respect only to damping, the onboard control receives sensor inputs representative of road conditions and, from the contact support 150, representative of the current damping capability of the damper portion 11 of the combination spring and damper 8. If the current damping capability is not in accordance with the programmed capability for the road condition being encountered by the vehicle, a plurality of electrical pulses are communicated to the winding 82 whereby the plunger is stroked between the at-rest and retracted positions to rotate the input driver 122 in step-wise fashion one tooth at a time. Since the contact carrier 148 rotates with the input driver 122, the plunger 86 continues to stroke until the input from the contact support 150 corresponds to the preprogrammed position of the input driver, whereupon the winding 82 is deenergized. The position of the input driver 122 thus achieved is then maintained by the flexible lever 132 engaging the circumferential teeth 128 on the head 123 of the input driver.

During rotation of the input driver about the axis 58 in step-wise fashion, the intermediate driver 138 likewise rotates through its rigid connection on hex shaft portion 126. Rotation of the intermediate driver is transmitted to the output driver 152 through the first end 178 of spring 177 between the projections 144a and 144b, the main body portion of the spring, and the second end 180 of the spring in the groove 164 in the head 158 of the output driver. Accordingly, as long as rotation of the output driver is unobstructed, the torsion spring 177 holds end face 170a against end face 146 so that the input and output drivers rotate as a unit. As the output driver 152 rotates, the inner tube 172 likewise rotates relative to the outer tube 64 so that the rotor 56 on the piston assembly 28 is rotated in step-wise fashion about the axis 58 through an angle corresponding to the angle of rotation of the input driver 122. The position of the input driver determined by the onboard control locates the rotor 56 in the one of its control positions corresponding to the damping capability most suited to the road conditions being encountered by the vehicle.

During jounce and rebound suspension excursions, sharp pressure increases or spikes may occur in the compression and rebound chambers 32 and 34 which can temporarily immobilize the rotor 56 on the piston assembly 28 during control input to the winding 82. In that situation, stroking of the plunger 86 continues so that the input driver 122 rotates until the contact support 150 signals the on-board control that the preprogrammed position of the input driver is achieved. However, the inner tube 172, being immobilized, prevents a corresponding rotation of the output driver 152 so that the abutment 142 and end face 146 on the intermediate driver separate from the arm 166a and end face 170a. Consequently the spring 177 is additionally torsionally stressed as the intermediate driver 138 rotates counter-clockwise, FIG. 4, relative to the output driver. When the pressure spike which temporarily immobilized the rotor 56 ceases and rotor mobility returns, the torsion spring 177 automatically rotates the output driver relative to the intermediate driver until end face 170a on arm 166a engages end face 146 on the abutment 142 whereupon rotation of the output driver ceases if the intermediate driver is stationary or continues to rotate as a unit with the intermediate driver if rotation of the latter has not ceased. Accordingly, the actuator 60 stores the control input during periods of rotor immobility and then automatically rotates the valve rotor to a desired position when mobility returns. The corresponding bevels on the end faces 170a and 146, preferably about 20°, function to cushion the impact of the output driver on the intermediate driver when mobility of the former returns. That is, when the end faces 170a and 146 are forced together as spring 177 uncoils, the intermediate and input driver are lifted axially against the resilience of the contacts between the contact support 150 and the contact carrier 148 and the force of pawl 116 on the input driver.

The embodiments of the invention in which an exclusive property or privilege is claimed are defined as follows:

1. In a hydraulic damper between sprung and unsprung masses of a vehicle including a hollow piston rod connected to said sprung mass, a fluid filled cylinder connected to said unsprung mass, a piston connected to said piston rod and slidable in said cylinder along a longitudinal axis of said damper during relative movement between said sprung and said unsprung masses and dividing said cylinder into a compression chamber and a rebound chamber, and valve means on said piston permitting fluid flow thereacross between said compression and said rebound chambers including a rotor rotatable between a plurality of control positions corresponding to different fluid flow rates for variable damping and subject to pressure induced temporary rotary immobility, a rotary actuator comprising, means within said hollow piston rod defining a housing rigidly connected to said piston rod, an output driver supported on said housing for rotation about said longitudinal axis and connected to said rotor for rotation as a unit therewith, a solenoid means on said piston rod including a plunger extending into said housing and having a longitudinal or stroke between an at-rest position and a retracted position, an actuator lever engageable by said plunger and supported on said housing for pivotal movement between a retracted position and an extended position in response to stroking of said plunger from said at-rest position to said retracted position, a pawl pivotally supported on said actuator lever, an input driver supported on said housing for rotation about said longitudinal axis through a plurality of angularly spaced positions corresponding to said control positions of said rotor, means on said input driver defining a plurality of face teeth in a plane perpendicular to said longitudinal axis, spring means biasing said pawl into engagement on said face teeth so that stroking of said plunger and pivotal movement of said actuator lever from said retracted to said extended position causes said pawl to rotate said input driver in step-wise fashion through said plurality of angularly spaced positions, said spring means biasing said input driver in the direction of said longitudinal axis against said housing, an intermediate driver supported on said housing for rotation about said longitudinal axis and having an axially extending abutment thereon, means rigidly connecting said input driver to said intermediate driver, means on said abutment defining a first beveled end face, means on said output driver defining an axially extending arm rotatable as a unit therewith, means on said arm defining a second beveled end face engageable on said first beveled end face, and a torsion spring between said intermediate driver and said output driver operative to normally hold said second beveled end face against said first beveled end face so that said intermediate and said output drivers are unitarily rotatable and further operative to permit rotation of said intermediate driver relative to said output driver during periods of rotor immobility and to thereafter rotate said output driver when rotor mobility returns until said second beveled end face engages said first beveled end face thereby to locate said rotor in the one of said control positions corresponding to the one of said angular positions of said input driver, said first and said second beveled end faces cooperating to urge said intermediate and said input drivers axially against said spring means thereby to cushion the shock of engagement of said second beveled end face on said first beveled end face.

* * * * *